Dec. 8, 1964   S. V. WINTON   3,159,913
CUTTER
Filed July 25, 1962
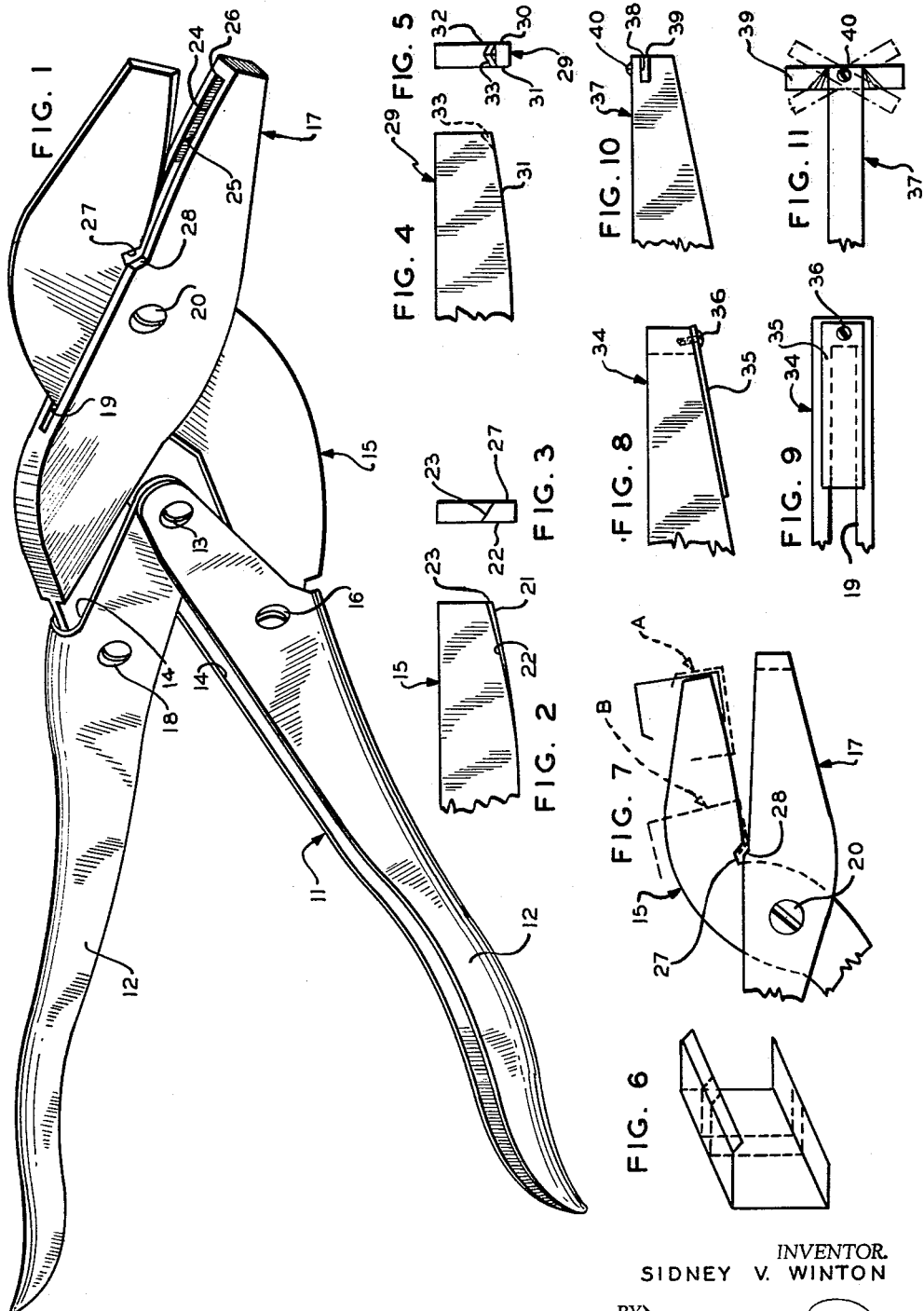
INVENTOR.
SIDNEY V. WINTON
BY
ATTORNEY

United States Patent Office 3,159,913
Patented Dec. 8, 1964

3,159,913
CUTTER
Sidney V. Winton, New York, N.Y., assignor to Randall
Manufacturing Company, Inc., a corporation of New
Jersey
Filed July 25, 1962, Ser. No. 212,774
6 Claims. (Cl. 30—252)

My invention relates to metal cutters generally and specifically to a metal cutter adapted to sever and remove discrete segments of metal after each closure of the cutting blades.

Kitchen counter tops and similar articles are frequently provided with a generally U-shaped metal, snap-on molding. The molding is provided in long strips and is cut to the desired length with a metal cutter since it is sufficiently thin. However, because of the irregular shape of the molding, an ordinary shears which cuts or notches a continuous path in the manner of a scissors has been found unsatisfactory. As the cutter proceeds, it must pass irregular corners frequently 90° or more. Unless the cutter can be oriented so that the blades engage the work piece at right angles to its plane, bending or distortion of the work piece will result. In order to accomplish this, cut portions of the work piece must be removed after each flat portion thereof has been cut.

Therefore, it is among the objects and advantages of my invention to provide a cutting tool adapted to sever discrete portions of the work piece after each closure of the cutting blades.

Another object of my invention to to provide a cutter having a unitary cutting blade adapted to progressively and closely engage and seat within a channel defined by a generally U-shaped cutting blade.

Still a further object of my invention is to provide a cutter adapted to sever discrete pieces of stainless steel or high pressure plastic laminates.

Yet another object of my invention is to provide a cutter which is adapted to cut irregularly shaped channels, strips, molding and like work pieces fabricated of any tough material without bending or otherwise distorting the work piece.

Still a further object of my invention is to provide a cutter having a unitary cutting blade with three cutting edges adapted to progressively engage the work piece while maintaining a proper cutting angle at all times.

These objects and advantages as well as other objects and advantages may be achieved by my invention, one embodiment of which is shown in the drawings in which:

FIGURE 1 is a view in perspective of my cutter.

FIGURE 2 is a side elevational view of the unitary cutting blade.

FIGURE 3 is an end elevational view of the cutting blade shown in FIGURE 2.

FIGURE 4 is a side elevational view of an alternative unitary cutting blade.

FIGURE 5 is an end elevational view of the cutting blade shown in FIGURE 4.

FIGURE 6 is a view in perspective of a typical counter top snap-on molding showing the portion severed by my cutter in dotted lines.

FIGURE 7 is a side elevational view of the two cutting blades of my cutter engaging the molding shown in FIGURE 6 in three positions adapted to cut it in half without bending or distortion.

FIGURE 8 is a side elevational view of a channeled cutting blade having a protective guard on its bottom.

FIGURE 9 is a bottom plan view of the channeled blade shown in FIGURE 8.

FIGURE 10 is a side elevational view of another unitary cutting blade having a pivotal guide secured thereto.

FIGURE 11 is a bottom plan view of the blade and guide shown in FIGURE 10.

Referring now to the drawings in detail, my cutter comprises a well-known compound leverage system 11 comprising a pair of handles 12, 12 pivotally secured together at one end by a pin 13. The end of each of the handles adjacent to the pivot pin 13 is provided with a channel 14, 14 adapted to receive a blade 15 or 17. A solid, unitary blade 15 is pivotally mounted to one of the handles 12, by means of a pin 16. A channeled blade 17 is pivotally mounted to the opposite handle 12 by means of a pin 18. The blade 17 is provided with a channel 19 adapted to receive blade 15. Blades 15 and 17 are pivotally secured together by means of a pin 20 passing therethrough.

The unitary, solid blade 15 is provided with two longitudinal cutting edges 21 and 22 and a latitudinal or cross cutting edge 23 at one end joining edges 21 and 22 together. Cutting edges 21 and 22 are each slightly arcuate as is shown in FIGURE 2 to provide the proper cutting angle as blade 15 passes through the channel 19 in the blade 17. The edge 22 is slightly more arcuate than edge 21 so the cross-edge 23 at the end of the blade 15 joining edges 21 and 22 together is pitched at an angle to the plane of the blade 15, thereby producing a cutting angle for edge 23.

The top inner edges of the channel 19 on blade 17 define a pair of generally parallel cutting edges 24 and 25. In addition, there is a cross cutting edge 26 joining edges 24 and 25 together at one end of the blade. Edges 24, 25 and 26 lie in a plane generally perpendicular to the plane of blades 15 and 17.

In operation, compression of levers 12, 12 rotate blades 15 and 17 about pin 20 causing the cutting edges 21 and 22 of blade 15 to progressively pass into the channel 19 in blade 17 closely passing edges 24 and 25 of blade 17 in a cutting fashion. Of course, blade 15 is slightly less thick than the width of the channel 19 adjacent to edges 24 and 25. As the blades 15 and 17 progressively come together, a work piece located therebetween is progressively cut along two parallel lines. After opposing edges 21 and 24 and 22 and 25 have cut the work piece along their entire lengths, cross-edge 23 of blade 15 progressively passes cross-edge 26 of blade 17 joining the two generally parallel longitudinal cuts together and severing a discrete strip of the work piece. This permits the work piece to be then repositioned between the open blades for another cut. In the case of counter top molding or channeling shown in FIGURE 6, discrete segments may be severed in the manner shown in FIGURE 7. In FIGURE 7, the first cut is shown with the channeling in solid lines whereby a discrete segment representing one leg of the U-shaped molding is removed. After this segment has been removed, the molding is rotated 90° in order to sever a segment representing the face leg thereof as is shown in dotted lines at A. Since a segment of the first leg has been removed, the blade 15 may pass through the opening in the first leg thereby permitting blades 15 and 17 to attack at right angles to the plane of the second leg of the work piece. Thus, a right angle cut is negotiated without bending the work piece. After removal of the segment of the second leg, the final leg may be cut as is shown in the second dotted line portion B of FIGURE 7. In this manner, the entire channeling may be cut in three operations without bending or otherwise distorting the channeling.

It should be noted that in FIGURES 1 and 7, the unitary blade 15 is shown with a notch 27 where it joins blade 17 near their pivot point 20. In addition, a channeled blade 17 is provided with an inclined portion 28 adapted to oppose the edges of blade 15 in the notch 27. The notch portion 27 of the blade 15 is adapted to pass by the inclined portion 28 of the blade 17 to cut the small angled lip on the channeling shown in FIGURE 6. However, it should be borne in mind that the blades 15 and 17 may be fabricated without the notch and the angled portion of the channeling cut in a manner analogous to that shown in FIGURE 7 thereby requiring four closures of the blades instead of three.

In FIGURES 4 and 5, an alternative unitary blade 29 is shown having a pair of parallel, arcuate edges 30 and 31 which are joined together at the end of the blade by a pair of inclined cross edges 32 and 33 defining a V-shaped notch in the end of the blade 29. Thus, as in the case of the blade 15 shown in FIGURES 2 and 3, the proper cutting angle is maintained between the cross edge 26 of the channeled blade 17 and the cross edges 32 and 33 of the unitary blade 29.

In FIGURES 8 and 9, a chaneled blade 34 is shown with a bottom 35 secured thereto by a small screw 36 passing upwardly into the channeled blade 34. The bottom 35 prevents the severed portion of the work piece from flying outwardly through the bottom of the channel to injure the operator or anyone standing nearby.

In FIGURES 10 and 11, a unitary blade 37 is shown with a transverse channel 38 at its end. A guide bar 39 is pivotally mounted in the transverse channel 38 by means of a screw 40. As is shown in FIGURE 11, the guide bar may be positioned at any angle to the longitudinal axis of the blade 37 and secured in position by means of tightening the screw 40. Thus, the angle of attack of the cutter may be precisely controlled.

It should be borne in mind that the channeled blade 17 may have an integral structure or may have a separate end segment seated within the channel at the end of the blade to define the cross-cut edge 26.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A cutter comprising,
(a) a pair of handles pivotally secured together at their ends,
(b) a unitary blade pivotally mounted intermediate the ends of one handle,
(c) a channeled blade pivotally mounted intermediate the ends of the other handle,
(d) the unitary blade passing through the channel in the channeled blade and pivotally secured thereto,
(e) a first longitudinal cutting edge on the unitary blade,
(f) a second longitudinal cutting edge on the unitary blade,
(g) a cross-cutting edge on the unitary blade joining the first and second longitudinal cutting edges, the cross-cutting edge disposed at an angle to the plane of the unitary blade,
(h) the first and second longitudinal cutting edges and the cross-cutting edge collectively defining a generally U-shaped cutting edge on the unitary blade,
(i) a generally U-shaped cutting edge on the channeled blade defined by the edges of the channel, and
(j) the U-shaped cutting edge on the unitary cutting blade adapted to progressively closely pass-by the U-shaped cutting edge on the channeled blade as the unitary blade pivots on the channeled blade and seats within the channel therein.

2. A cutter comprising,
(a) a pair of handles pivotally secured together at their ends,
(b) a unitary blade pivotally mounted intermediate the ends of one handle,
(c) a channeled blade pivotally mounted intermediate the ends of the other handle,
(d) the unitary blade passing through the channel in the channeled blade and pivotally secured thereto,
(e) a first generally arcuate longitudinal cutting edge on the unitary blade,
(f) a second generally arcuate longitudinal cutting edge on the unitary blade, the said second edge being slightly more arcuate than the first edge,
(g) a cross-cutting edge on the unitary blade connecing the first and second longitudinal edges,
(h) a generally U-shaped cutting edge on the channeled blade defined by the edges of the interior channel, and
(i) the said first arcuate cutting edge, the second said arcuate cutting edge and the cross-cutting edge collectively defining a generally U-shaped cutting edge on the unitary blade adapted to progressively closely pass-by the U-shaped cutting edge on the channeled blade as the unitary blade pivots on the channeled blade and seats within the channel therein.

3. A cutter comprising,
(a) a pair of handles pivotally secured together at their ends,
(b) a unitary blade pivotally mounted intermediate the ends of one handle,
(c) a channeled blade pivotally mounted intermediate the ends of the other handle,
(d) the unitary blade passing through the channel in the chaneled blade and pivotally secured thereto,
(e) a first longitudinal cutting edge on the unitary blade,
(f) a second longitudinal cutting edge on the unitary blade,
(g) a generally inverted V-shaped cross-cutting edge on the unitary blade connecting the first and second longitudinal edges and disposed at an angle to the plane of the channeled blade,
(h) a generally U-shaped cutting edge on the chaneled blade defined by the edges of the channel, and
(i) the first and second arcuate longitudinal cutting edges and the cross-cutting edge on the unitary blade adapted to progressively pass-by the U-shaped cutting edge on the channeled blade as the unitary blade pivots on the channeled blade and seats within the channel therein.

4. A cutter comprising,
(a) a pair of handles pivotally secured together at their ends,
(b) a unitary blade pivotally mounted intermediate the ends of one of the handles and having a generally transverse channel therein, the transverse channel being positioned in the end of the blade opposite the handle,
(c) a channeled blade pivotally mounted intermediate the end of the other handle having a generally longitudinal channel,
(d) the unitary blade passing through the channel in the channeled blade and pivotally secured thereto,
(e) a generally U-shaped cutting edge on the chaneled blade defined by the edges of the channel,
(f) a generally U-shaped cutting edge on the unitary blade adapted to progressively closely pass-by the U-shaped cutting edge on the chaneled blade as the unitary blade pivots on the chaneled blade and seats within the channel therein, and (g) a guide pivotally mounted in the transverse channel in the unitary blade.

5. A cutter comprising,
(a) the structure in accordance with claim 1 and,
(b) a bottom on the longitudinal channel in the channeled blade partially obstructing the bottom of the channel.

6. A cutter comprising,
(a) the structure in accordance with claim 1 and,
(b) a notch in the unitary blade defining cutting edges connected to the first and second longitudinal cutting edges, and
(c) a pair of inclined cutting edges on the channeled blade opposite the notch in the unitary blade.

References Cited by the Examiner
UNITED STATES PATENTS

| | | | |
|---|---|---|---|
| 170,658 | 12/75 | Berridge | 30—258 |
| 879,900 | 2/08 | Potstada | 30—258 X |
| 1,086,286 | 2/14 | Fyhrie | 30—258 |
| 2,375,364 | 5/45 | Hood | 30—258 X |
| 2,642,657 | 6/53 | Arnt et al. | 30—258 X |
| 2,869,235 | 1/59 | Klenk | 30—252 |
| 2,874,465 | 2/59 | Sillak | 30—258 X |
| 2,931,100 | 4/60 | Wertepny | 30—258 |

WILLIAM FELDMAN, *Primary Examiner.*

EDWARD V. BENHAM, *Examiner.*